United States Patent [19]

Sakamoto et al.

[11] Patent Number: 4,708,108

[45] Date of Patent: Nov. 24, 1987

[54] METHOD AND SYSTEM FOR IDLE SPEED CONTROL

[75] Inventors: Masahide Sakamoto, Katsuta; Masami Shida, Mito, both of Japan

[73] Assignee: Hitachi, Ltd., Tokyo, Japan

[21] Appl. No.: 920,424

[22] Filed: Oct. 20, 1986

[30] Foreign Application Priority Data

Oct. 21, 1985 [JP] Japan .................................. 60-233276

[51] Int. Cl.4 .............................................. F02M 3/00
[52] U.S. Cl. .................................. 123/339; 123/479; 123/198 F
[58] Field of Search ............ 123/339, 340, 479, 198 F, 123/335

[56] References Cited

U.S. PATENT DOCUMENTS

| | | | |
|---|---|---|---|
| 2,771,867 | 11/1956 | Peras | 123/198 F |
| 4,198,933 | 4/1980 | Sieber | 123/335 |
| 4,499,876 | 2/1985 | Yamamoto | 123/479 |
| 4,520,272 | 5/1985 | Danno | 123/339 |
| 4,580,220 | 4/1986 | Braun | 123/339 |

Primary Examiner—Ronald B. Cox
Attorney, Agent, or Firm—Antonelli, Terry & Wands

[57] ABSTRACT

A method of controlling the idle speed of an internal combustion engine is disclosed, in which the rotations of the internal combustion engine is detected by a crank angle sensor, the flow rate of air supplied to the engine is detected by an air flow sensor, the amount of fuel supplied to the engine is controlled by a fuel supply unit, an idle condition of the engine is detected by another sensor, and an abnormal condition with the engine speed exceeding a predetermined level in idle state is detected by an electronic control unit by use of electrical signals from the sensors. The number of times fuel is supplied to the engine is counted, and the fuel supply is suspended each time the count of the counter reaches a predetermined value.

7 Claims, 6 Drawing Figures

METHOD AND SYSTEM FOR IDLE SPEED CONTROL

BACKGROUND OF THE INVENTION

The present invention relates to a method and a system for controlling the idle rotational speed of an internal combustion engine.

In the case of trouble in the operation of an idle rotational speed control system in which a solenoid valve is left open or a power transistor is left on, a conventional method of preventing an increased idle speed is by controlling the exhaust gas reflux (hereinafter referred to as the EGR) valve in such a manner as to open this valve, as disclosed in JP-A-57-186038. The disadvantage of this method, however, is that a change in the amount of EGR deteriorates the combustion and renders the engine speed unstable.

SUMMARY OF THE INVENTION

The object of the present invention is to provide a method and system for controlling the idle speed in which upon detection of trouble in the operation of the idle speed control system (that is, an abnormally high engine speed) in the idle speed control process, the idle speed is prevented from increasing thereby to stabilize the rotational speed.

According to the present invention, there is provided a method and system for idle speed control in which, if the engine speed is higher than a predetermined value in the idle mode, the fuel supply is interrupted for each cylinder and the number of cylinders in which fuel is burnt is reduced.

DESCRIPTION OF THE PREFERRED EMBODIMENTS

Figure 2:
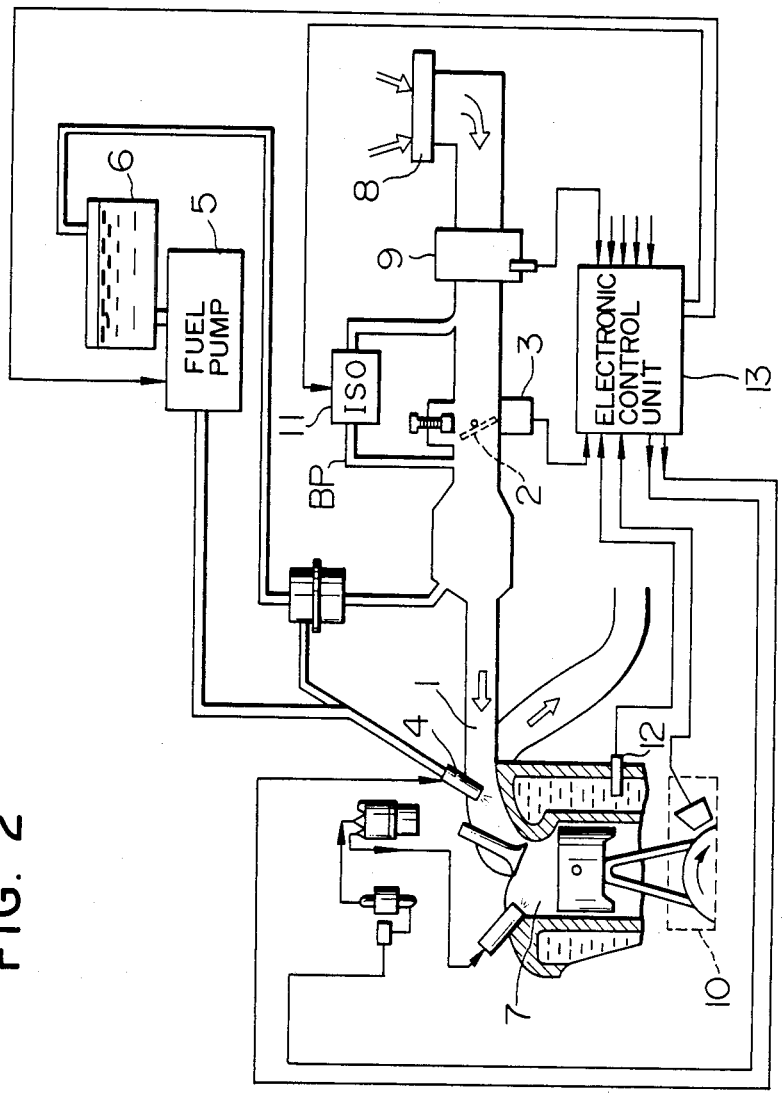
FIG. 2 is a diagram showing an engine control system.

An embodiment of the present invention will be explained below. In FIG. 2, the air taken into the engine is applied through an air cleaner 8 and measured in an air flow sensor 9, and through a throttle 2 and an intake manifold 1, is introduced into cylinder 7. An electronic control unit 13 is supplied with signals from the air flow sensor 9, a crank angle sensor 10, a cooling water temperature sensor 12 and an idle switch 3 for detecting a full throttle closure, and converts these signals into digital signals. On the basis of these digital signals, the amount of fuel required by the engine is computed by a digital computer in the electronic control unit 13 thereby to produce a signal representing the valve opening time of the injector 4. The fuel is pressured by a fuel pump 5 from the fuel tank 6 and supplied into the injector 4. Also, a BP solenoid valve 11 is disposed in a passage bypassing the throttle valve 2, and by controlling this BP solenoid valve 11, the area of the bypass is controlled thereby to regulate the engine speed at a predetermined level in idle mode.

Figure 3:
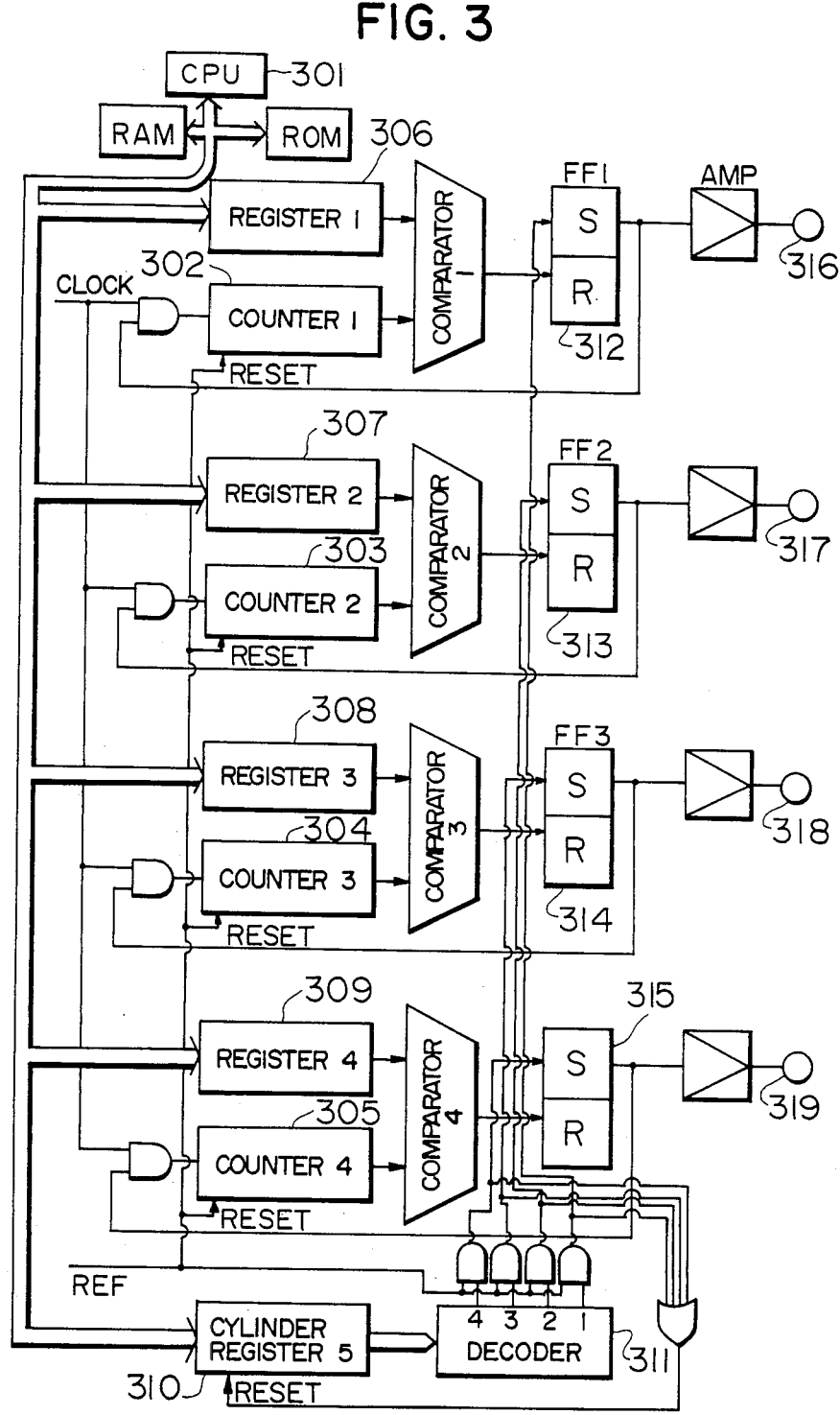
FIG. 3 is a block diagram showing an injector drive unit.
Figure 4:
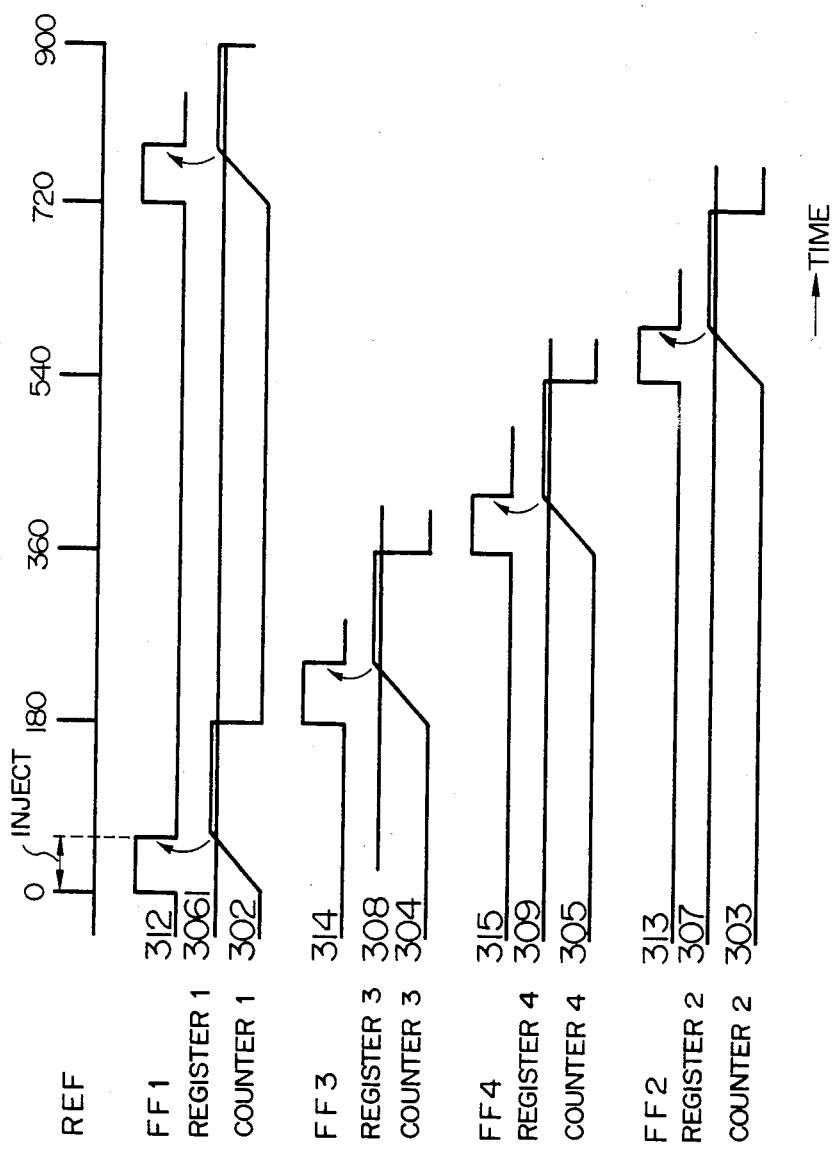
FIG. 4 is a time chart showing the operating conditions of the flip-flop, register and counter for each cylinder.

A block diagram of the injector drive unit is shown in FIG. 3. The digital computer (hereinafter referred to as the CPU) 301 in the electronic control unit 13 computes the amount of fuel required by the engine, converts the amount of fuel thus calculated into an injector valve opening time, writes the resultant time into one of the registers 306 to 309 associated with the cylinder into which fuel is to be injected, and further writes data specifying the cylinder to be supplied with fuel in the cylinder register 310. The signal applied from the cylinder register 310 to the decoder 311 opens an AND gate for passing a signal REF representing a predetermined angle. The REF signal sets a predetermined flip-flop (hereinafter referred to as the FF). One of the counters 302 to 305 corresponding to the registers 306 to 309 which is associated with the FF thus set is impressed with a clock signal which is counted. When a comparator shows that the resultant count of the counter is larger than the value of the register mentioned above, the FF is reset. During the time period from when the FF is set and to the time point when it is reset, a drive signal is applied to a corresponding one of the injectors 316 to 319. This signal opens the injector valve for a predetermined length of time thereby to supply fuel into the cylinder of the particular injector. A time chart indicating the operations of the register, the FF, and the counter of each cylinder in FIG. 3 is shown in FIG. 4. Each cylinder is adapted to be supplied with fuel as required at predetermined timings.

Figure 5:
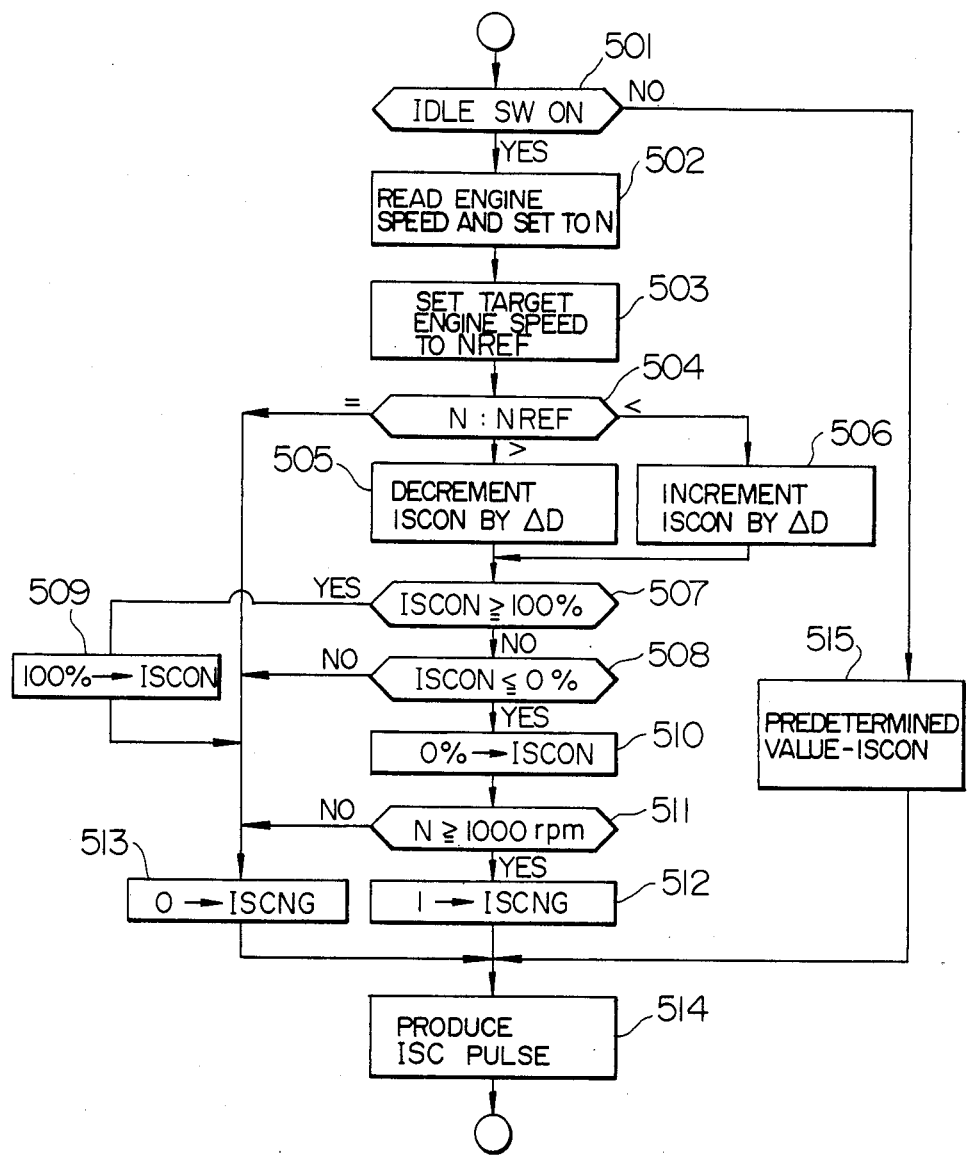

Now, explanation will be made of the manner in which the idle engine speed is controlled with reference to FIG. 5. In this control method, which is well known, idle trouble is detected regardless of the cylinders. First, step 501 checks to see whether an idle switch 3 is turned on or off. If the idle switch 3 is turned on, that is, if the throttle is closed up step 502 reads the engine speed and sets it to N. (Stored in RAM) Next, step 503 sets the target engine speed in idle mode to NREF, followed by step 504 for comparing N and NREF with each other. If N is equal to NREF, step 513 clears an idle control fault flag ISCNG. If N is larger than NREF, on the other hand, the duty factor ISCON of the duty signal applied to the solenoid valve is reduced by ΔD (Step 505). In the case where N is smaller than NREF, step 506 increases ISCON by ΔD thereby to increase the engine speed. Step 507 checks to see whether the flag ISCON has exceeded 100%, and if it is exceeded, step 509 renders ISCON equal to 100%, followed by step 513. If ISCON is smaller than 100%, by contrast, step 508 checks whether ISCON is lower than 0%. If ISCON is larger than 0%, the process proceeds to step 513, while if ISCON is smaller than 0%, step 510 renders ISCON equal to 0%. Further, step 511 makes a comparison to see whether the engine speed N is higher than 100 rpm, and if N is smaller than 1000 rpm, the process proceeds to step 513, while if N is equal to or higher than 1000 rpm, it indicates that the engine speed is excessively high in spite of the supply signal to the solenoid valve being stopped, so that the idle control system is regarded as faulty and the flag ISCNG is set to 1. In other cases, ISCNG is set to 0 at step 513. Step 514 produces a pulse to be supplied to the solenoid valve.

Figure 1:
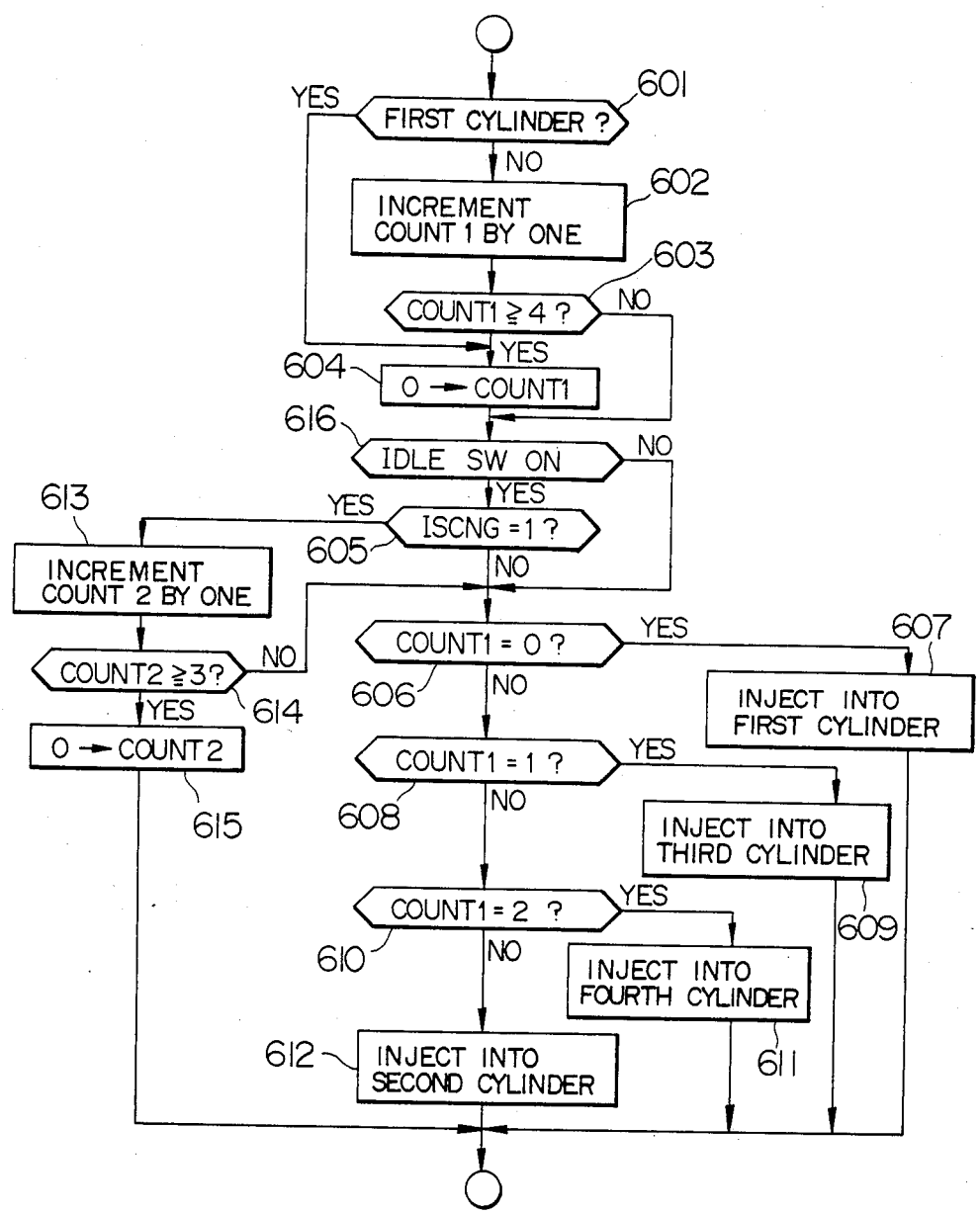
FIGS. 1 and 5 are flowcharts showing embodiments of the present invention.
Figure 6:
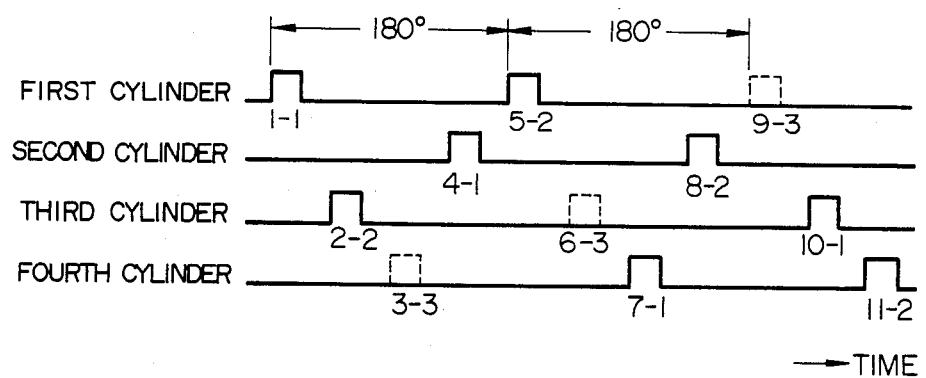
FIG. 6 is a time chart for a fuel injection pulse output according to the embodiments of the present invention.

A flowchart for a fuel injection system for supplying each cylinder is shown in FIG. 1 as an embodiment most closely related to the features of the present invention. The parts shown in this flowchart are adapted to run in synchronism with the signal from the crank angle sensor generated at every 180° of crank angle of the engine. First, step 601 checks a first cylinder decision signal by use of a sensor mounted on, say, the distributor, and if the first cylinder is involved, step 604 clears the flag COUNT1. If the first cylinder is not involved, on the other hand, step 602 increments COUNT1 by one, followed by step 603 for checking whether COUNT1 has become 4 or not. If it has become 4, step 604 clears the flag COUNT1. Step 605 then checks whether the idle control system is in trouble, and if it is found normal, steps 606, 608 and 610 check the content of flag COUNT1 thereby to determine a cylinder for injection. If COUNT1 is zero, by contrast, step 607 injects into the first cylinder, while if COUNT1 is 1, step 609 injects fuel into the third cylinder. When COUNT1 is 2, step 611 injects into the fourth cylinder, and if COUNT1 is not 2, step 612 makes injection into the second cylinder. As a result, fuel is injected into the first, third, fourth and second cylinders in that order at regular intervals of 180° in crank angle. If step 616 decides that the idle switch is turned on while the idle control system is found faulty at step 605, on the other hand, step 613 increments the flat COUNT2 by one, followed by step 614 for checking whether or not COUNT2 has become 3. If COUNT2 is smaller than 3, steps 606 to 612 inject fuel into predetermined cylinders. If COUNT2 is equal to or larger than 3, step 615 clears the flag COUNT2, thereby preventing fuel from being injected into any of the cylinders. A time chart of a fuel injection pulse output according to the present embodiment is shown in FIG. 6. The pulse indicated by dashed line shows that no injection is made. According to this embodiment, a cylinder is not injected at regular intervals of three injections thereby to prevent the engine speed from increasing, while the cylinders injected with fuel are supplied with the required amount of fuel and therefore perform a combustion with the right mixing ratio to attain a smooth engine operation.

In the embodiment shown in FIG. 1, an injection is omitted for the cylinders sequentially. Specifically, following each two injections, a third injection is omitted for each cylinder. In FIG. 6, injections 3-3, 6-3 and 9-3 are omitted. Apart from this method, all injections of only one specific cylinder may be omitted. If the injection of the fourth cylinder is to be omitted, for instance, step 605 is inserted in the "YES" route of step 610, so that step 611 is actuated if there is no trouble, while step 611 is bypassed if there is any trouble.

It will thus be understood from the foregoing description that according to the present invention, even in the case where the idle speed control system is in trouble, the idle engine speed is prevented from increasing abnormally on the one hand, and a smooth engine rotation is obtained on the other hand.

What is claimed is:

1. A method of controlling the idle speed of an internal combustion engine comprising a crank angle sensor for detecting the rotations of the internal combustion engine, an air flow sensor for detecting the flow rate of air supplied to said engine, fuel supply means for controlling the amount of fuel supplied to the engine, a sensor for detecting that the engine is in an idle state, means for effecting a feed-back control of an idle rotation speed to a predetermined value by controlling the amount of air supplied to the engine, and an electronic control unit capable of detecting an abnormal idle speed cotrol condition in which the engine speed exceeds a predetermined value in the idle state on the basis of electrical signals from said sensors, said method comprising the steps of counting the number of times fuel is supplied to the engine when the electronic control unit detects said abnormal idle speed control condition and suspending the fuel supply to at least one cylinder of the engine each time the count reaches a predetermined value.

2. A method according to claim 1, wherein fuel is not supplied to different ones of a plurality of said engine cylinders at regular intervals of time.

3. A method according to claim 1, wherein fuel is not supplied to a predetermined specific one of a plurality of said engine cylinders when the electronic control unit detects said abnormal idle speed control condition.

4. A system for controlling the idle speed of an internal combustion engine, comprising a crank angle sensor for detecting the rotations of the internal combustion engine, an air flow sensor for detecting the flow rate of air supplied to the engine, fuel supply means for controlling the amount of fuel supplied to said engine, a sensor for detecting that the engine is in an idle state, means for effecting a feed-back control of an idle rotation speed to a predetermined value by controlling the amount of air supplied to the engine, an electronic control unit capable of detecting an abnormal idle speed condition in which the engine speed exceeds a predetermined value in idle state by use of electrical signals from said sensors, counter means responsive to said electronic control unit for counting the number of times fuel is supplied to said engine when said abnormal idle speed condition is detected, and means for suspending fuel supply to at least one cylinder of said engine each time the count of said counter means reaches a predetermined value.

5. A system according to claim 4, wherein said fuel supply suspending means comprises means for suspending the supply of fuel to different ones of a plurality of said engine cylinders at regular intervals of time.

6. A system according to claim 4, wherein said fuel supply suspending means comprises means for suspending the supply of fuel to a predetermined specific one of a plurality of said engine cylinders.

7. A method according to claim 1, wherein said counting is restarted each to the count equals or exceeds said predetermined value.

* * * * *